United States Patent [19] [11] 4,178,080
Elder [45] Dec. 11, 1979

[54] ADJUSTABLE NOSE PIECE ASSEMBLY FOR EYEGLASSES

[76] Inventor: Eugene E. Elder, 121 Belmont, Hebron, Nebr. 68370

[21] Appl. No.: 828,988

[22] Filed: Aug. 30, 1977

[51] Int. Cl.² .................... G02C 5/12; G02C 5/04; G02C 1/00
[52] U.S. Cl. ................................ 351/137; 351/128; 351/76; 351/88
[58] Field of Search .................. 351/137, 128, 76, 88

[56] References Cited

U.S. PATENT DOCUMENTS

| | | | |
|---|---|---|---|
| 1,609,477 | 12/1926 | King | 351/137 |
| 3,345,121 | 10/1967 | DeAngelis | 351/137 X |
| 3,552,838 | 1/1971 | Hawks | 351/137 X |
| 4,032,223 | 6/1977 | Bradley | 351/137 X |

Primary Examiner—John K. Corbin
Assistant Examiner—Rodney B. Bovernick
Attorney, Agent, or Firm—Lowe, Kokjer, Kircher, Wharton & Bowman

[57] ABSTRACT

This invention discloses a nose piece assembly for adjustably mounting a nose piece to an eyeglasses frame having a pair of correction lenses connected to each other by a rigid cross piece. In the preferred embodiment, the nose piece assembly comprises a nose piece for engaging the nose of the wearer, a mounting member for adjustably connecting the nose piece to the cross piece of the eyeglasses, and a guide way for maintaining the alignment between the nose piece and the eyeglasses. The outer dimensions of the nose piece are standardized while the inner size and shape are selected in accordance with the facial features of the wearer to ensure maximum visual acuity and comfort. The mounting member consists of a long slender mounting pin having a threaded end portion arranged to engage an internally threaded hole in the nose piece. The mounting member is rotatably mounted on the eyeglasses frame and raises or lowers the nose piece in response to rotational motion imparted to the mounting member. The guide way is comprised of a track on the eyeglasses frame and a groove cut in the nose piece. Alternate embodiments of the present invention showing different ways for interchangeably mounting the nose piece to the cross piece of the eyeglasses frame are also disclosed herein by this invention.

6 Claims, 7 Drawing Figures

ADJUSTABLE NOSE PIECE ASSEMBLY FOR EYEGLASSES

BACKGROUND AND BRIEF DESCRIPTION OF THE INVENTION

This invention relates generally to an improved nose piece assembly for eyeglasses and more particularly to an adjustable nose piece assembly that can be easily adjusted to improve the fit of the eyeglasses thereby improving visual acuity and diminishing the annoyance often associated with wearing eyeglasses.

Selection of the appropriate corrective lenses is only the first step in curing a visual defect. The corrective lenses must be mounted within an eyeglasses frame that maintains perfect alignment between the optical axis of the corrective lens and that of the eye. Eyeglasses are designed to correct defects in vision commonly caused by refractive errors inherent in the eye. As a result of these refractive errors, light entering the eyes is not focused directly onto the retina of the eye. The corrective lenses of the eyeglasses compensate for these refractive errors by refracting the incoming rays of light so that the light entering the eye is focused directly onto the retina. Since the rays of light refracted by the corrective lenses pass through another medium—air—before entering the eye, the slightest tilt or improper alignment of the eyeglasses produces a disturbing effect that inhibits maximum visual acuity. The stronger the corrective lenses, the more severe are the aberrations produced by the wearer looking through any part of the lenses other than the optical axis. Conventional eyeglasses have a nose piece that is rigidly fixed in size, shape and position and consequently cannot be adjusted to perfectly align the optical axis of the corrective lens with that of the eye to provide maximum visual acuity.

Eyeglasses can also be a source of constant annoyance for the person wearing them if they are not properly fitted. A nose piece that is too narrow continuously presses upon the nose of the wearer producing sensitive areas that are easily irritated by the eyeglasses. On the other hand, a nose piece that is too wide provides improper support for the eyeglasses upon the nose so that they are constantly sliding down the bridge of the nose impairing visual acuity and constantly annoying the wearer.

It is therefore an object of the present invention to provide a nose piece assembly for adjustably mounting a nose piece onto an eyeglasses frame.

Another object of the present invention is to provide an adjustable nose piece assembly for eyeglasses that easily and quickly adjusts the positional relationship between the nose piece and its associated eyeglasses frame in order to perfectly align the optical axis of the corrective lenses with that of the eyes to ensure maximum visual acuity.

Another object of the present invention is to provide an adjustable nose piece assembly for eyeglasses that mounts the nose piece onto the cross piece of the eyeglasses frame by means of a mounting member having a threaded end portion that engages the nose piece and draws the nose piece to or away from the cross piece of the eyeglasses frame in response to rotational motion imparted to the mounting member thereby raising or lowering the corrective lenses with respect to the eyes.

A further object of the present invention is to provide a nose piece assembly that is capable of mounting nose pieces having standardized outer dimensions and various internal sizes and shapes into various eyeglasses frames in order to standardize the connection of nose pieces to eyeglasses frames thereby making nose pieces of various sizes and shapes interchangeable with each other.

An additional object of the present invention is to provide a nose piece assembly that is capable of mounting nose pieces having numerous different internal sizes and shapes onto a single eyeglasses frame in order to perfectly align the optical axis of the corrective lenses with that of the eyes to provide maximum visual acuity.

A further object of the present invention is to provide a nose piece assembly that is capable of mounting nose pieces having numerous different internal sizes and shapes onto a single eyeglasses frame in order to improve the fit and comfort of the eyeglasses.

It is a further object of the present invention to provide a nose piece assembly for eyeglasses that includes a guide way for securely maintaining the alignment between the nose piece and the eyeglasses frame.

Other and further objects of the present invention, together with the features of novelty appurtenant thereto, will appear in the course of the following description.

DETAILED DESCRIPTION OF THE INVENTION

In the accompanying drawings which accompany the specification and are to be read in conjunction therewith, and in which like reference numerals are employed to indicate like parts in the various views.

Figure 1:
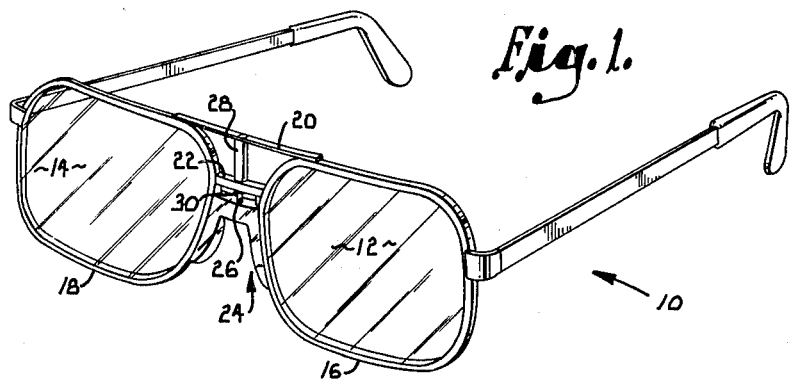
FIG. 1 is a perspective view of a typical eyeglasses frame having a nose piece assembly constructed in accordance with the present invention attached to the cross piece of the frame.
Figure 2:
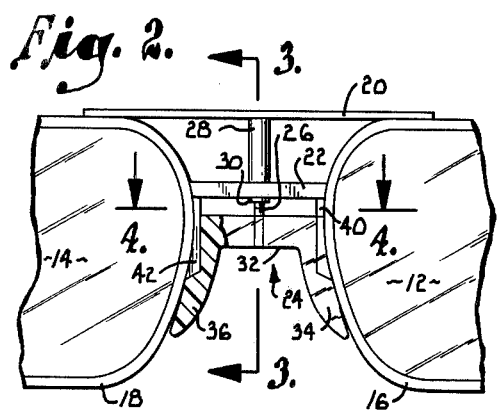
FIG. 2 is a fragmentary front elevational view of an eyeglasses frame showing a nose piece adjustably mounted in accordance with the present invention to the cross piece of the frame.

FIGS. 1, 2, 3 and 4 show the adjustable nose piece assembly of the present invention as it is used in combination with a conventional eyeglasses frame 10. The eyeglasses frame 10 is comprised of a pair of corrective lenses 12 and 14 which are each encircled by frame casings 16 and 18. Frame casings 16 and 18 are constructed of a sturdy metal or rigid plastic. As shown in FIGS. 1 and 2, frame casings 16 and 18 are secured to each other in spaced-apart relationship by means of an upper cross piece 20 and a lower cross piece 22 which are also constructed of a sturdy metal or rigid plastic.

Referring now to FIGS. 1, 2, 3 and 4, the adjustable nose piece assembly of the present invention is basically comprised of a nose piece 24, a mounting member 26, a mounting casing 28 and retaining ring 30. The nose piece is typically constructed of a rigid plastic or another suitable material.

The nose piece includes an arched bridge portion 32 and lateral leg portions 34 and 36 that are coplaner with the arched bridge portion and with each other. The lateral leg portions extend away from the arched bridge portion in the same direction thereby providing a "U-shaped" contact area that conforms to the nose of the wearer.

Figure 3:
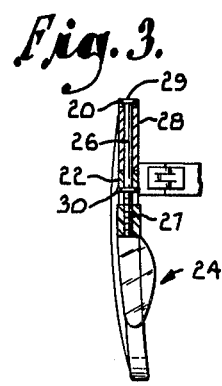
FIG. 3 is a cross sectional view taken along line 3—3 of FIG. 2 in the direction of the arrow.

It should be noted at this time that the internal size and shape of the nose piece shown in FIGS. 1, 2 and 3 are merely illustrative and are not in any way a limitation upon the configuration of the nose piece. In fact, the nose piece can be of any size, shape and thickness as long as the outer dimensions of the nose piece conform to the space between the corrective lenses. In the preferred embodiment of the invention, the inner size and configuration of the nose piece are varied while the outer dimension and shape of the nose piece are standardized so that nose pieces having a number of different internal sizes and shapes will be interchangeable with each other to provide maximum visual acuity and comfort.

The nose piece is secured to the eyeglasses frame by means of mounting member 26. Mounting member 26 is comprised of a long slender mounting pin having a threaded end portion arranged to engage an internally threaded hole 38 in the nose piece. The other end of the mounting member has an enlarged head portion 29, which is beveled and has a slot cut therein for imparting rotational motion to the mounting member.

Mounting member 26 fits within a mounting channel formed by a hole in the upper cross piece 20, the mounting casing 28, and a hole in the lower cross piece 22. As shown in FIG. 3, mounting casing 28 is hollow thereby providing a cavity through which mounting member 26 extends. The mounting channel is formed by securing mounting casing 28 to the upper cross piece 20 and to the lower cross piece 22 so that the cavity in the mounting casing is properly aligned with the holes in the upper and lower cross pieces. The mounting channel is slightly greater in diameter than the shaft of the mounting member allowing for rotatable movement of the member within the mounting channel. Retaining ring 30 fits tightly around mounting member 26 and is provided to secure the mounting member in place within the mounting channel. The hole in the upper cross piece is beveled to correspond with the shape of the head of mounting member 26 so that the head will be level with the upper surface of the cross piece when mounting member 26 is fully inserted and secured in place within the mounting channel.

Figure 4:
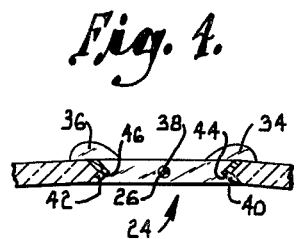
FIG. 4 is a fragmentary sectional view taken along line 4—4 of FIG. 2 in the direction of the arrows.

Referring now primarily to FIGS. 2 and 4, a guide way is provided to properly align and secure the nose piece 24 in place with respect to the eyeglasses frame 10. The guide way consists of tracks 40 and 42 which are positioned on the external surface of each lens casing just below the lower cross piece 22. Tracks 40 and 42 respectively engage grooves in the nose piece at 44 and 46 to securely hold the nose piece in place with respect to the eyeglasses frame. The guide way can also be arranged so that the tracks are on the external surface of the nose piece and the grooves are cut in the eyeglasses frame.

In use, mounting member 26 is inserted through the mounting channel formed by the hole in the upper cross piece 20, the hollow cavity in the mounting casing 28, and the hole in the lower cross piece 22. The mounting member 26 is arranged in the mounting channel so that the threaded end portion extends beyond the lower cross piece and the mounting head fits within the beveled hole in the upper cross piece. The mounting member is then secured in place within the mounting channel by means of retaining ring 30 which fits securely around the shaft of mounting member 26. It should be also noted that the threaded portion of mounting member 26 stops just below the point where the retaining ring is positioned.

Once a nose piece of the proper internal size and shape has been selected, the threaded part of mounting member 26 is arranged to engage the internally threaded hole 38 in the nose piece. The grooves 44 and 46 in the external surface of the nose piece are also aligned with their respective tracks 40 and 42 so that the grooves on each side of the nose piece securely engage the appropriate track. Thereafter, mounting member 26 is rotated until the nose piece is properly positioned on the shaft of the mounting member. The eyeglasses frame can be easily raised or lowered to align the optical axis of the corrective lenses with that of the eyes by merely rotating mounting member 26 in a clockwise or counter-clockwise direction. The eye-to-lens distance is also adjusted by placement of hole 38. As hole 38 is moved off-center, the eyeglasses will be closer to or farther from the face depending upon the direction in which the hole is moved. If hole 38 is moved off-center, grooves 44 and 46 must also be varied accordingly.

Figure 5:
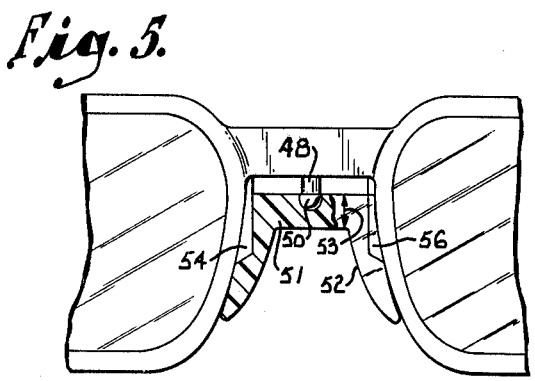
FIG. 5 is a fragmentary front elevational view of an eyeglasses frame showing an alternate embodiment of the present invention wherein the nose piece is mounted to the cross piece of the eyeglasses frame in a different manner.

Referring now to FIG. 5, an alternate method for securing the nose piece to the eyeglasses frame is shown in this figure. In this embodiment of the invention, threaded mounting member 26 is replaced by a mounting post 48 having an enlarged head 50 which engages a socket on the nose piece 52 thereby snapping the two pieces together. The external dimensions of the nose piece are standardized but the internal size and configuration of the nose piece are selected to provide the best fit in terms of comfort and visual acuity. For example, the raising or lowering of the eyeglasses frame to perfectly align the optical axis of the corrective lenses with that of the eye is accomplished by selecting a nose piece having an arched bridge portion 51 of the appropriate thickness 53. In this embodiment of the invention, the nose piece cannot be adjusted by rotating the mounting post but rather must be varied by changing the thickness of the arched portion of the nose piece. A guide way consisting of tracks 54 and 56 is also provided in this embodiment of the invention to align and secure the nose piece in place with respect to the eyeglasses frame.

Figure 6:
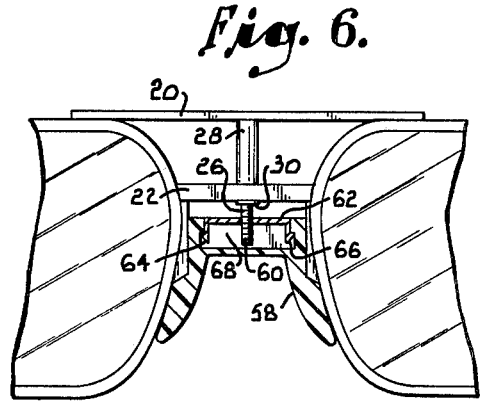
FIG. 6 is a fragmentary front elevational view of an eyeglasses frame showing an interchangable nose piece adjustably mounted to the cross piece of the eyeglasses frame.
Figure 7:
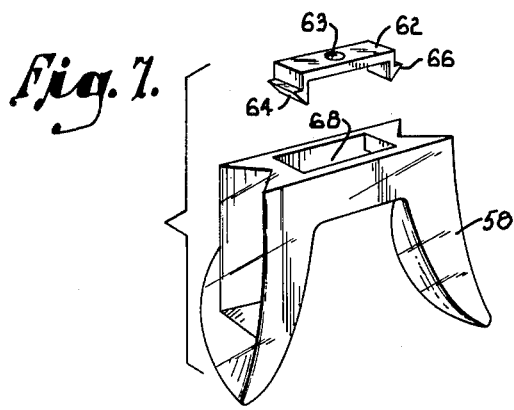
FIG. 7 is an exploded view of a mounting clamp for interchangably securing the nose piece to an eyeglasses frame.

Referring now to FIGS. 6 and 7, a third method for securing the nose piece to the eyeglasses frame is shown in these two figures. In this embodiment of the invention, the nose piece 58 is secured to the eyeglasses frame by means of a rotatable mounting member 60 which is identical to mounting member 26 described above with respect to FIGS. 1 through 4 and a "U-shaped" mounting plate 62. Mounting plate 62 has an internally threaded hole 63 which engages rotable mounting member 60 to raise or lower the nose piece in response to the clockwise or counter-clockwise rotation of mounting member 60. Mounting plate 62 includes locking arms 64 and 66 which are constructed of a resilient material and are arranged to engage the nose piece by snapping in place within the locking chamber 68 in the nose piece. Locking arms 64 and 66 each have an inclined surface which moves the locking arms inward as the mounting plate 62 is being inserted into the locking chamber 68. Once the mounting plate is fully inserted in the locking chamber, the locking arms expand causing the projecting surface of the locking arms to engage the sides of the locking chamber thereby securing the nose piece to the mounting plate. While mounting plate 62 is shown in FIG. 6 as being threadably secured to mounting member 60, the mounting plate can also be attached to the cross piece of the eyeglasses frame by means of a mounting post having an enlarged head similar to mounting post 48 shown in FIG. 5.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A nose piece assembly for use in combination with an eyeglasses frame having a first eyeglass lens and a second eyeglass lens secured to each other by means of a rigid cross piece, said nose piece assembly comprising:
    a nose piece for supporting said eyeglasses frame upon the nose, said nose piece having an arched bridge portion with an internally threaded aperture defined in the upper surface thereof and a pair of coplanar leg portions arranged such that one leg portion extends outward from the bottom surface of said bridge portion at each end thereof;
    a single continuous mounting channel defined in said cross piece;
    a threaded mounting pin having a threaded end portion, said mounting pin being arranged to pass through said mounting channel such that said pin is freely rotatable therein and to threadably engage the internally threaded aperture in said nose piece so that said nose piece is threadably movable along the threaded end portion of said mounting pin; and
    guideway means for aligning and securing said nose piece in place with respect to said eyeglasses frame.

2. The nose piece assembly as in claim 1 wherein said guideway means is comprised of:
    a first lens casing encircling said first eyeglass lens;
    a second lens casing encircling said second eyeglass lens;
    said first and second lens casings being secured to each other by means of said cross piece;
    a narrow raised portion on the outer surface of said first and second lens casings, said raised portion being positioned below said cross piece and arranged to form a guide track; and
    a groove defined in the external side surface of each leg portion of said nose piece, said grooves being arranged to cooperatively engage the guide track on said first lens casing and said second lens casing.

3. The nose piece assembly as in claim 1 including a retaining ring for securing said mounting pin in place within said mounting channel.

4. A nose piece assembly for use in combination with an eyeglasses frame having a first eyeglass lens and a second eyeglass lens secured to each other by means of a rigid cross piece, said nose piece assembly comprising:
    a mounting plate having a flat base portion with an internally threaded aperture defined therein and at least one locking arm;
    a nose piece for supporting said eyeglasses frame upon the nose, said nose piece having an arched bridge portion with a mounting opening defined in the upper surface thereof and a pair of coplanar leg portions arranged such that one leg portion extends outward from the bottom surface of said bridge portion at each end thereof, said mounting opening being arranged to receive said locking arm to fixedly secure said nose piece to said mounting plate;
    a single continuous mounting channel defined in said cross piece;
    a threaded mounting pin having a threaded end portion, said mounting pin being arranged to pass through said mounting channel such that said pin is freely rotatable therein and to threadably engage the internally threaded aperature in said mounting plate so that said mounting plate is threadably movable along the threaded end portion of said mounting pin in response to rotational movement of said mounting pin; and
    guideway means for aligning and securing said nose piece in place with respect to said eyeglasses frames.

5. The nose piece assembly as in claim 4 wherein said guideway means is comprised of:
    a fist lens casing encircling said first eyeglass lens;
    a second lens casing encircling said second eyeglass lens;
    said first and second lens casings being secured to each other by means of said cross piece;
    a narrow raised portion on the outer surface of said first and second lens casings, said raised portion being positioned below said cross piece and arranged to form a guide track; and
    a groove defined in the external side surface of each leg portion of said nose piece, said grooves being arranged to cooperatively engage the guide track on said first lens casing and said second lens casing.

6. The nose piece assembly as in claim 4 including a retaining ring for securing said mounting pin in place within said mounting channel.

* * * * *